May 10, 1949.  S. L. C. COLEMAN  2,469,713
UNIVERSAL JOINT
Filed Aug. 2, 1945
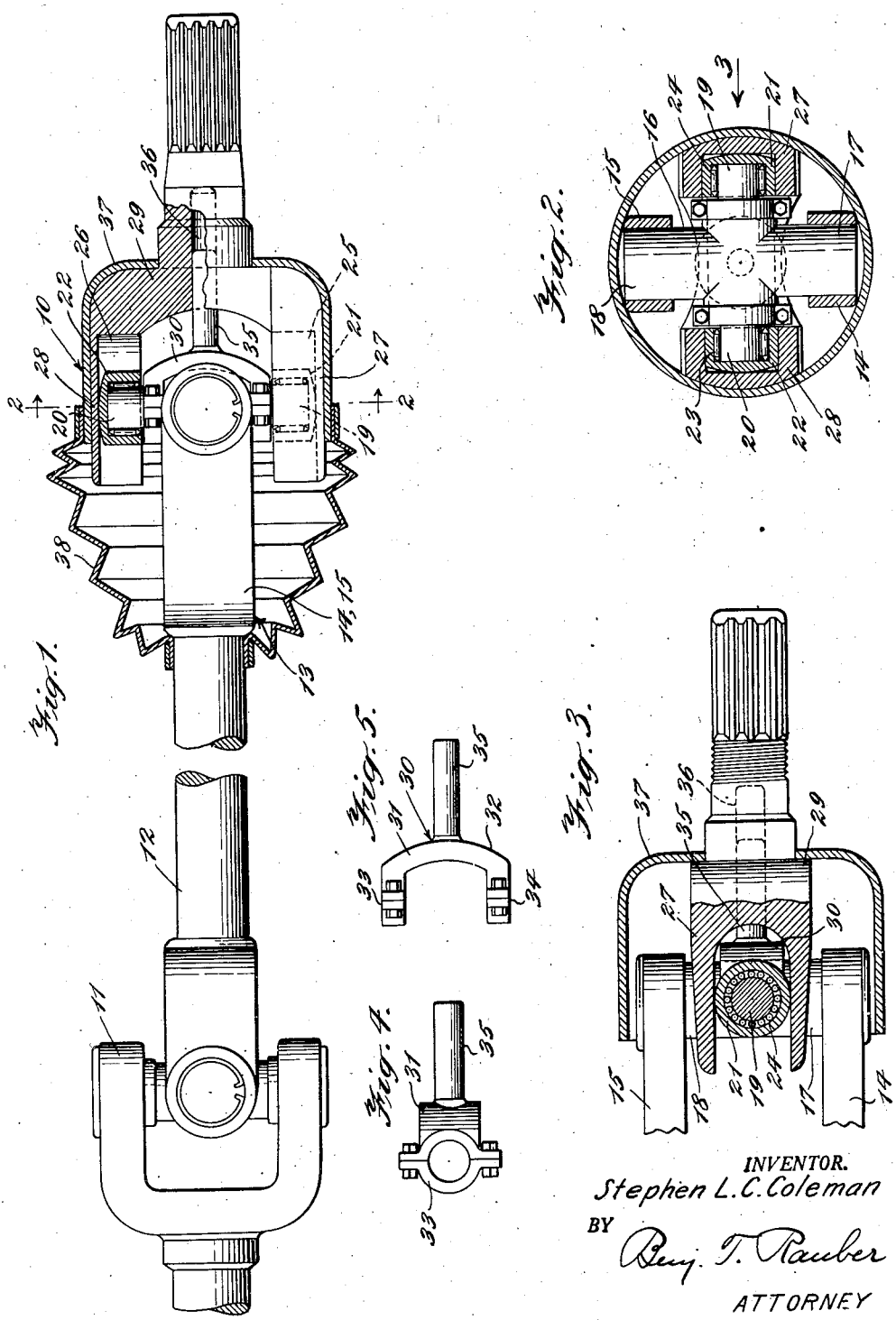
INVENTOR.
Stephen L. C. Coleman
BY
Benj. T. Rauber
ATTORNEY Patented May 10, 1949

2,469,713

UNITED STATES PATENT OFFICE 2,469,713

UNIVERSAL JOINT

Stephen L. C. Coleman, Fredericton, New Brunswick, Canada

Application August 2, 1945, Serial No. 608,441
In Great Britain August 4, 1943

3 Claims. (Cl. 64—23)

My present invention relates to a universal joint of the type in which two oppositely positioned yokes are connected by a connecting element having two pairs of trunnions at right angles to each other, one of which is journalled in one yoke and the other in the other yoke.

Universal joints of the above type are used to join shafts which are not in exact alignment and in which the relative positions of the shafts may vary. For example a universal joint of the above type may be employed as part of a transmission between the engine of a vehicle and a driving axle, or between a driving shaft and independently sprung wheels of a vehicle.

As the shafts rotate and particularly as the relative positions of the shaft change, as in the case of transmission mechanism between an engine and a driving axle, the distance or length between the driving elements varies. Heretofore this variation has been taken up by a spline or other type of slip joint in the shafting itself.

In my present invention this variation in the overall length of the transmission is taken up in the universal joint itself, thereby removing the necessity for a spline or slip joint in the shafting. For this purpose the arms of one yoke are provided with a pair of longitudinal grooves on their inner or opposed faces and in these grooves are received one pair of trunnions of the connecting element or cross in such manner that these trunnions may slide or move longitudinally of the groove. To minimize friction and wear between the trunnion and the groove each trunnion is provided with a roller bearing comprising a circle of rollers and an enclosing outer ring or ring-shaped raceway which is of a diameter to permit it to roll freely in its respective groove of the yoke. As the distance or length of the transmission varies these trunnions roll or slide in their respective grooves to provide the necessary adjustment in length. To prevent tilting of the trunnions relative to the grooved yoke the pair of trunnions that slides in the grooves is held in a fixed position with its axis at a right angle to the center of rotation of the grooved yoke. For this purpose a guiding or control yoke may be provided having arms or bearings to rotatably engage the groove-engaging trunnions and having a stem extending into a longitudinal bore or recess in the grooved yoke so that the trunnion may slide freely but may not rotate on an axis transverse to its length.

The various features of my invention are illustrated by way of example in the accompanying drawing in which Fig. 1 is a side view of a transmission embodying the preferred form of my invention, a part being broken away to show one of the grooves and the roller bearing;

Fig. 2 is a cross-section taken on the line 2—2 of Fig. 1;

Fig. 3 is a side view, partly in section, of a universal joint embodying my invention, taken in the direction of the arrow 3 of Fig. 2;

Figs. 4 and 5 are respectively side views, taken at right angles to each other, of a guiding or control yoke.

In the accompanying drawings a universal joint 10 embodying my invention is shown as part of a transmission comprising also a universal joint 11 and a drive shaft 12. The universal joint 11 may be of any usual type inasmuch as all adjustments in the length of the transmission are taken up in the universal joint 10.

The universal joint of my present invention comprises a driving yoke 13 formed at one end of the shaft 12 and having a pair of spaced parallel arms 14 and 15. A connecting element 16 is positioned between arms 14 and 15 and comprises a pair of trunnions 17 and 18 journalled in the arms, and integral therewith are a pair of trunnions 19 and 20 at right angles to and in the same plane as the trunnions 17 and 18. Mounted on each of the trunnions 19 and 20 are respectively roller bearings each comprising a ring 21 and 22 respectively on a circular series of rollers 23 and 24. The trunnions 19 and 20 project into longitudinal grooves 25 and 26 in the opposed or inner faces of the arms 27 and 28 respectively of a yoke 29. The rings 21 and 22 of the trunnions 19 and 20 fit the grooves 25 and 26 respectively with just sufficient clearance to permit them to roll in these grooves as the cross or connecting element moves longitudinally of the yoke 29 with each shortening or lengthening of the overall length of the transmission.

It will be apparent that the rollers or bearings 21 and 22 should roll on axes at a right angle to the length of the grooves 25 and 26 and should therefore be held in fixed position relative to the yoke 29. A control yoke 30 is, therefore, provided having, as shown in Figs. 4 and 5, a pair of arms 31 and 32 on the ends of which are mounted bearings or journals 33 and 34 which engage the trunnions 19 and 20 respectively while permitting these trunnions to rotate or rock about their longitudinal axes.

The yoke 30 and the trunnions 19 and 20 are held at right angles to the arms of the yoke 29 by a stem 35 of the control yoke 30 which projects into a longitudinal bore or recess 36 in the yoke 29. The stem 35 may slide in the recess 36 as the cross and the trunnions 19 and 20 move longitudinally in the grooves 25 and 26, but prevents these trunnions from rotating or rocking on an axis transverse to their longitudinal axes.

The universal joint 10 may be protected from loss of lubricant and from access of dirt or grit by a cup shaped cover 37 enclosing the yoke 29 and a connecting bellows 38 mounted fluid-tight at one end on the cup 37 and at the other end secured fluid-tight on the shaft 12.

The above invention provides a universal joint which obviates the necessity for any slip joint or spline in the transmission shaft. All adjustments in length are accomplished in the joint itself by a rolling movement between the roller bearings on the trunnions 19 and 20 and the arms of the yoke 29. Friction and wear are, therefore, reduced to a minimum.

The grooves 25 and 26 may be open at their ends so that the trunnions 19 and 20 and their roller bearings may be readily slipped out of the grooves for repairs or replacements.

What I claim is:

1. A universal joint comprising a connecting element having pairs of trunnions at right angles, a yoke having arms in which one pair of said trunnions is journaled, a pair of roller bearings, one for each trunnion of the other pair of trunnions, a second yoke having a pair of arms and a longitudinal groove in each arm to receive a roller bearing of said trunnions, a control yoke engaging said second pair of trunnions and having a sliding engagement with said second yoke.

2. A universal joint comprising a connecting element having pairs of trunnions at right angles, a yoke having arms in which one pair of said trunnions is journaled, a pair of roller bearings, one for each trunnion of the other pair of trunnions, a second yoke having a pair of arms and a longitudinal groove in each arm to receive a roller bearing of said trunnions, said second yoke having a longitudinal bore parallel to the recesses in its arms and a control yoke engaging said second pair of trunnions and having a stem in sliding engagement with the bore of said second yoke.

3. A universal joint comprising a connecting element having pairs of trunnions at right angles, roller bearings on one pair of said trunnions, a yoke having arms with oppositely positioned longitudinal recesses to receive said roller bearings, a control yoke engaging said trunnions and having a sliding engagement with said first mentioned yoke to hold said trunnions at a right angle to the axis of said yoke.

STEPHEN L. C. COLEMAN.

REFERENCES CITED

The following references are of record in the file of this patent:

UNITED STATES PATENTS

| Number | Name | Date |
|---|---|---|
| 730,604 | Brazier | June 9, 1903 |
| 891,152 | Douglas | June 16, 1908 |
| 1,153,984 | Watts | Sept. 21, 1915 |
| 1,462,016 | Lewis | July 17, 1923 |
| 2,341,084 | Dodge | Feb. 8, 1944 |